(12) United States Patent
McCormick et al.

(10) Patent No.: US 8,312,989 B2
(45) Date of Patent: Nov. 20, 2012

(54) ARTICULATED FLAT SURFACE CONVEYOR BELT WITH SIDE LINK

(75) Inventors: Stephen A. McCormick, Warrington, PA (US); Simon Shamoun, Acworth, GA (US)

(73) Assignee: Linde Aktiengesellschaft, Munich (DE)

( * ) Notice: Subject to any disclaimer, the term of this patent is extended or adjusted under 35 U.S.C. 154(b) by 94 days.

(21) Appl. No.: 12/844,104

(22) Filed: Jul. 27, 2010

(65) Prior Publication Data

US 2012/0024676 A1    Feb. 2, 2012

(51) Int. Cl.
*B65G 17/06* (2006.01)
(52) U.S. Cl. ........................ 198/851; 198/849
(58) Field of Classification Search ........... 198/848–853
See application file for complete search history.

(56) References Cited

U.S. PATENT DOCUMENTS

| | | | | |
|---|---|---|---|---|
| 1,285,448 | A * | 11/1918 | Spooner | 100/173 |
| 2,666,404 | A * | 1/1954 | Kessler | 110/329 |
| 3,447,668 | A | 6/1969 | Jernigan | |
| 3,985,224 | A * | 10/1976 | Harvey | 198/851 |
| 4,252,235 | A | 2/1981 | Schepers et al. | |
| 6,607,064 | B2 * | 8/2003 | Inoue | 198/324 |
| 7,762,388 | B2 * | 7/2010 | Lago | 198/834 |
| 7,802,675 | B2 * | 9/2010 | Hall | 198/848 |
| 7,987,972 | B2 * | 8/2011 | Hennigar et al. | 198/848 |
| 2009/0107805 | A1 * | 4/2009 | Layne et al. | 198/617 |
| 2012/0018281 | A1 * | 1/2012 | Mccormick et al. | 198/493 |

FOREIGN PATENT DOCUMENTS

NL    1 030 353    5/2007

OTHER PUBLICATIONS (EP Search Report), Oct. 31, 2011.
European Search Report for EP 11 17 5475, Date of Mailing: Oct. 31, 2011, Authorized Officer: Emmanuel Schneider, 5 pp.

* cited by examiner

*Primary Examiner* — Mark A Deuble
(74) *Attorney, Agent, or Firm* — Joshua L. Cohen

(57) ABSTRACT

A conveyor belt for transporting a product, includes a plurality of transport assemblies, each one of the plurality of transport assemblies comprising a side link assembly; a support assembly connected to the side link assembly; a product support member supported on the support assembly and adapted for displaceable movement with respect to the side link assembly and the support assembly; and an actuation member supporting the product support member with respect to the side link assembly and the support assembly, the actuation member coacting with the side link assembly for moving the product support member between a first position wherein the product support member is in a first plane of travel with respect to the side link assembly for conveying the product, and a second position wherein the product support member transitions to a second plane of travel with respect to the side link assembly different from the first plane of travel for providing a space between the product support member of each one of the plurality of transport assemblies.

8 Claims, 4 Drawing Sheets

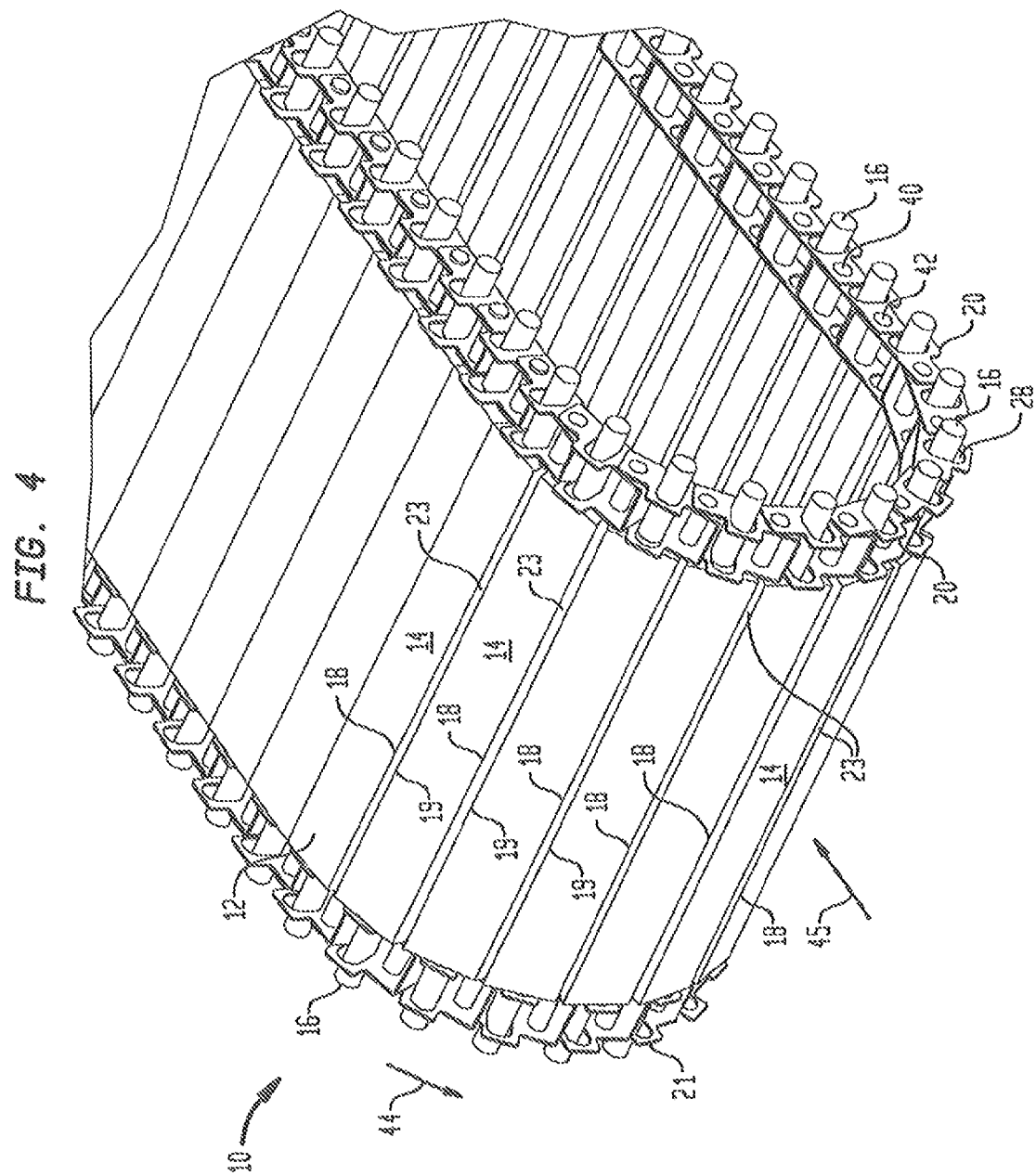

ARTICULATED FLAT SURFACE CONVEYOR BELT WITH SIDE LINK

Certain conveying operations for transporting product, such as food products, require that individual products be spaced apart from adjacent products to prevent contact with each other when entering a freezing system such as an immersion, tunnel or spiral freezing system. When products, such as food products, are to be processed in an immersion, tunnel or spiral freezing system, the known conveyor belts are not able to provide for fully individual quick frozen (IQF) product without additional actuation means to prevent adjacent products from contacting each other and "clumping", unless the products are initially separated from each other prior to entering the freezing system. The separation of the food products so as not to contact each other requires additional labor or other apparatus when processing the food product with known belts. Known conveyor system structures also provide many "harborage points" for undesirable matter and contaminants. Therefore, producing IQF food product with known systems entails additional labor and/or processing equipment, and increases the chance of contamination.

The present embodiments include a conveyor belt surface consisting of a plurality of adjacent sections, each of which are moveable with respect to each other, which in turn provides for movement of the products and separation of same from each other as the products are conveyed on the belt surface. Products, such as food products, are therefore frozen individually, as opposed to freezing in clumps of the product. The surface of the conveyor belt embodiments herein allow for freezing or crust freezing of food products having a wet surface without formation of belt marks on a surface of the products. In addition, the arrangement and displacement of the sections of the conveyor belt provides for quick, easy sanitation of the belt, because there are fewer harborage points at the belt where food product can be trapped. Moreover, the product support surface of the belt can be displaced from the conveying base or assembly of the belt during cleaning to allow more space and therefore easier and more complete sanitation of the spaces and areas between and among the transport assembly and the product support surface of the belt.

BRIEF DESCRIPTION OF THE DRAWINGS

For a more complete understanding of the present embodiments, reference may be had to the following drawing figures taken in conjunction with the description of the embodiments, of which:

FIG. 4 shows a conveyor belt embodiment executing a turn.

DESCRIPTION OF THE INVENTION

The present conveyor belt embodiments permit movement of a section of a belt surface with respect to adjacent sections of the belt surface, which in turn provides for movement of the product along the belt surface and effective cleaning of the belt. The belt surface may be displaced, and such displacement also displaces the food product on the belt surface, such that adjacent food product does not contact each other, which avoids unacceptable "clumping" of the individual food products. Displacement of the belt surface also provides for more effective and efficient cleaning of the conveyor belt.

Figure 1:
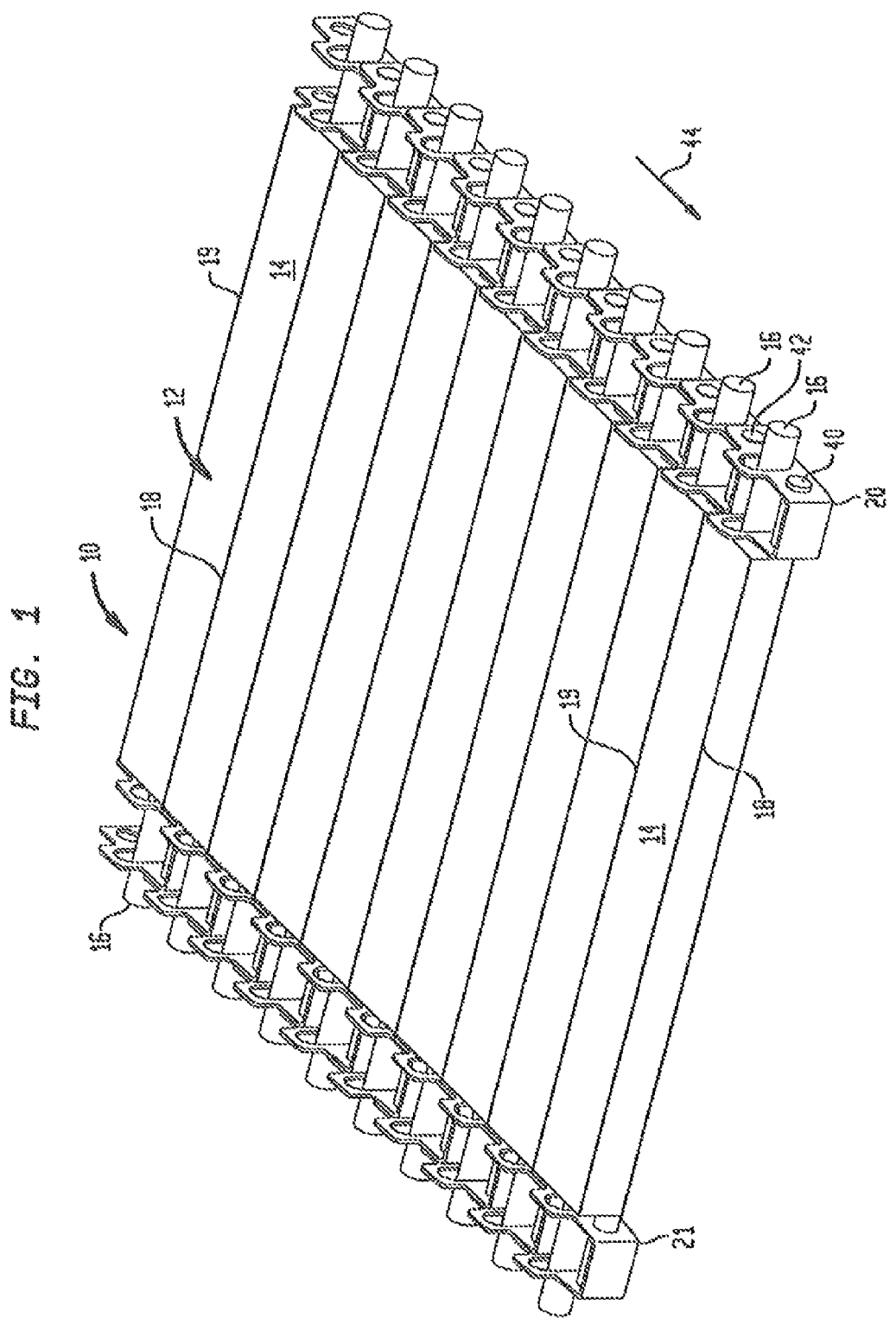
FIG. 1 shows a section of the conveyor belt embodiment.
Figure 2:
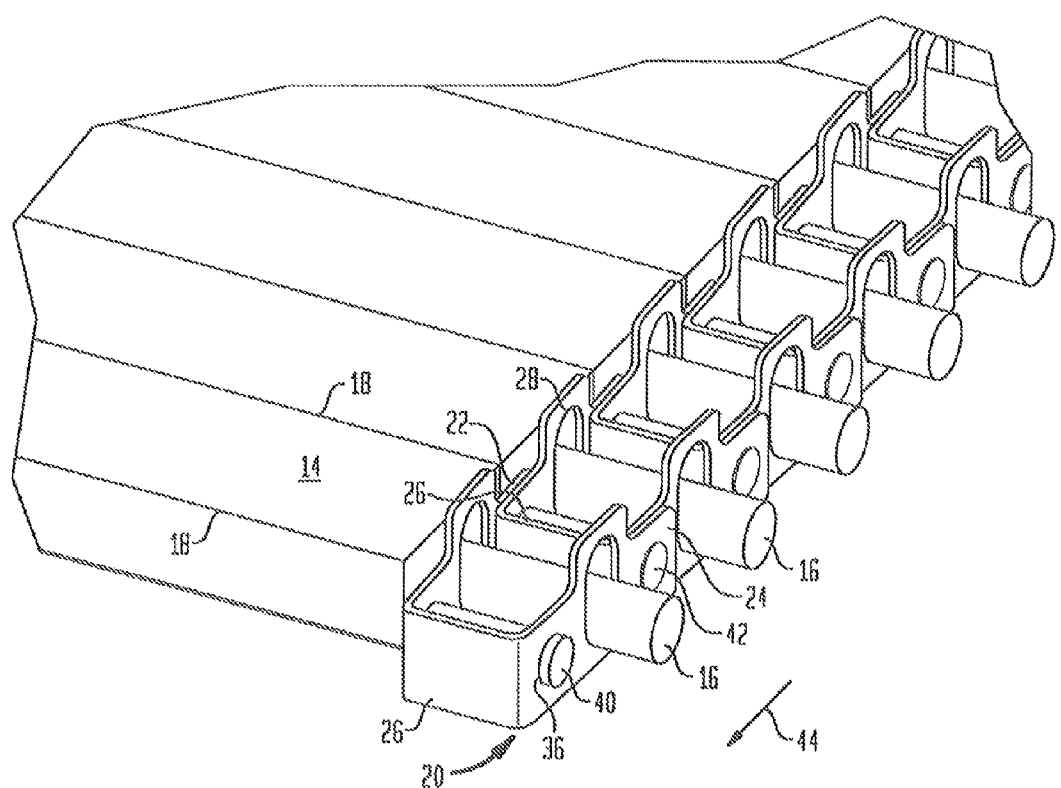
FIG. 2 shows an enlarged portion of the section of FIG. 1.
Figure 3:
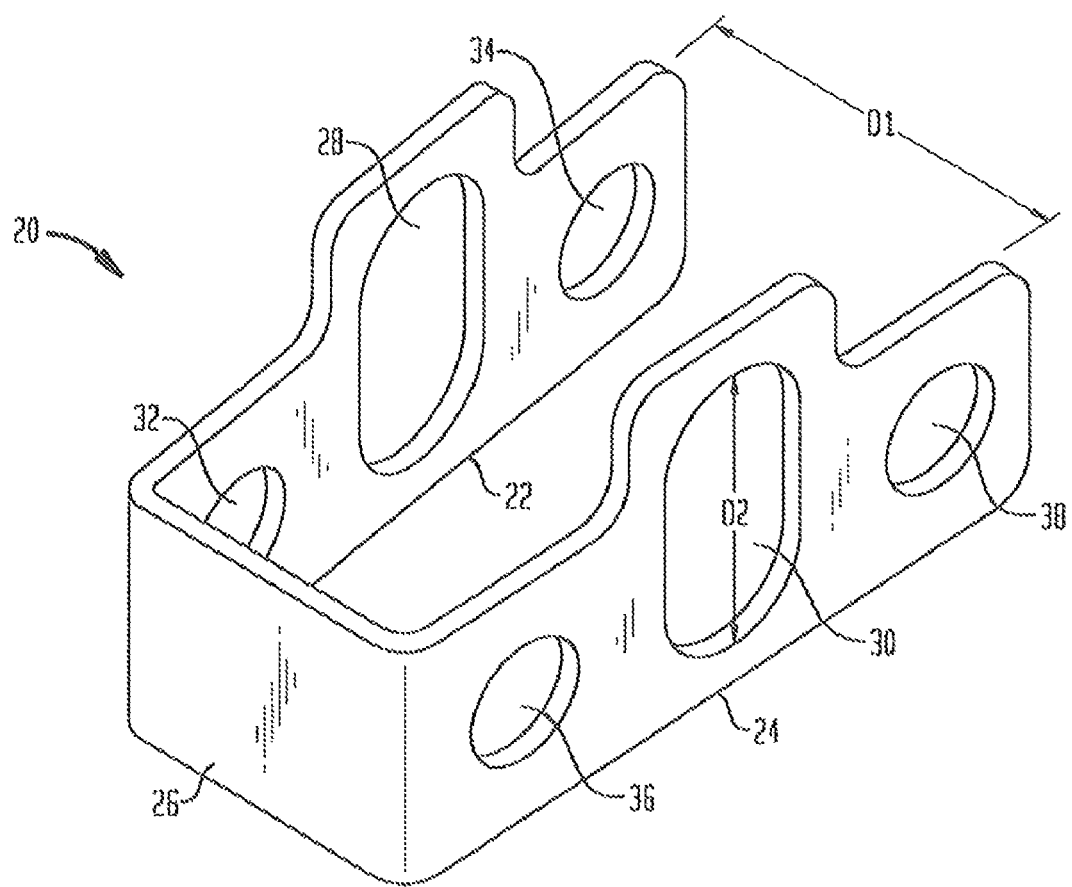
FIG. 3 shows a side link of the conveyor belt embodiment of FIG. 1.

Referring to FIGS. 1-3, there is shown a portion of a conveyor belt embodiment 10 which includes a conveyor belt surface shown generally at 12. The conveyor belt embodiment 10 consists of a plurality of transport assemblies which coact with each other. Each one of the transport assemblies includes a longitudinal member 14, a pin 16, a pair of side links 20,21 and a pair of rods 40, 42. The conveyor belt transports products (not shown) such as for example food products.

The conveyor belt surface 12 (for the sake of brevity referred to as the "conveyor surface") consists of a plurality of the longitudinal members 14 as product support surfaces (each one for the sake of brevity referred to as a "support members"). Each of the support members 14 may be manufactured from stainless steel or plastic materials for example. That is, each one of the support members 14 may be formed from one piece of plastic or one piece of stainless steel. The support members 14 when disposed adjacent to each other provide the conveyor surface 12. Each support member 14 is constructed as a longitudinal member supported upon a pin 16 which extends through or underneath the support member 14 as will be explained hereinafter. The pins 16 may be manufactured from stainless steel. The support members 14 each have opposed longitudinal edges 18,19 which abut a corresponding longitudinal edge 18,19 as the case may be, of an adjacent support member 14.

Referring in particular to FIG. 3, a side link 20 is shown as U-shaped and constructed to coact with an adjacent side link 21 for actuation of the conveyor belt 10 during processing and cleaning modes. Each side link 20,21 includes a pair of arms 22,24 interconnected by a base portion 26. Each one of the arms 22,24 is provided with a corresponding oblong-shaped central aperture 28,30, respectively. A pair of holes 32,34 in the arm 22 are each disposed at an opposed side of the central aperture 28, while a pair of holes 36,38 in the arm 24 are each disposed at an opposed side of the central aperture 30. The holes 32,34,36,38 (collectively "32-38") may be circular in shape. The central apertures 28,30 are constructed and arranged to receive a corresponding one of the pins 16 as shown for example in FIG. 2. The side links 20,21 may be constructed from steel or other alloy.

Distance "D1" represents a distance of the space between the arms 22,24. Distance "D2" represents a height of each one of the central apertures 28,30. The distance D1 is sufficient to permit the base portion 26 and corresponding arms 22,24 of an adjacent side link 20 (or 21) to be received into the space, base 26 first, between the arms 22,24 of the side link 20 (or 21). For example, referring to FIGS. 2 and 3, it is shown how the base portion 26 of a side link 20 can be received between the arms 22,24 of an adjacent side link 20 such that the holes 32,36 of one of the side links 20 come into registration with the holes 34,38 of the adjacent receiving side link.

Still referring to FIGS. 2 and 3, each one of the support members 14 rests upon a corresponding pair of rods 40,42. The rods 40,42 may be manufactured from steel. The rods 40,42 each extend through corresponding apertures 32,36 and 34,38 for each one of the side links 20,21. The rods 40,42 extend underneath the support members 14 to support same with respect to a corresponding one of the side links 20,21. Accordingly, while the plurality of side links 20,21 at each side of the conveyor belt 10 are connected to each other by the pins 40,42, each one of the support members 14 can be freely and individually displaced with respect to adjacent and other ones of the support members 14 because the pin 16 has freedom of movement to be displaced in the central apertures 28,30 and therefore, displace the conveyor belt surface 12 as well.

As shown in FIG. 1, the arrangement of the side links 20,21 is at both opposed sides of the conveyor belt 10. It can be seen then, that selective displacement of the pins 16 can result in selective displacement of the support members 14 to provide for a vibratory or articulating conveyor surface 12, if required, during movement of the conveyor belt 10. Such displacement of the support members 14 also provides for easier and more thorough cleaning of the members 14 and other elements of the conveyor belt embodiment 10, as discussed below.

An underlying surface of the support members 14 may be constructed and arranged with a beveled or contoured portion for receiving a corresponding one of the rods 40,42.

In FIGS. 1, 2 and 4 the conveyor belt 10 is moving in the direction of arrow 44.

Referring to FIG. 4, the conveyor surface 12 is shown with the opposed longitudinal edges 18, 19 of support members 14 abutting each other so that a smooth, nonporous conveyor surface 12 is provided for the conveyor belt 10. This occurs at least at an upper run or top tier of the conveyor belt run. As the conveyor belt 10 transitions around a sprocket or wheel (not shown) to execute the turn shown in FIG. 4, the pins 16 are displaced in the central apertures 28,30 of the side links 20,21 to facilitate spacing 23 or a space between and among the support members 14 to negotiate the turn. The displacement of the support members 14 can be under the effect of gravity or by mechanical displacement means (not shown). The product, such as food product, can be removed under the effective gravity from the conveyor surface 12 for processing such as for example packaging, or for further treatment prior to packaging. Another example of further processing is to crust-freeze the product (now having no belt markings) for subsequent freezing in a final-freeze process. The use of the plastic support members 14 substantially reduces if not eliminates product sticking to the belt. The product may be further processed in a belt press to obtain uniform product thickness for a plurality of products being processed.

Still referring to FIG. 4, if not for gravity, a device or mechanism (not shown) has tripped or actuated the pins 16 such that they are or remain displaced in their corresponding central apertures 28,30 with the longitudinal edges 18,19 of adjacent support members 14 moved apart from one another to thereby provide the space 23 between adjacent support members 14. The space facilitates cleaning of the support members 14 of any extraneous food product or contaminate material. The spacing 23 also promotes subsequent drying after washing or rinsing of the support members 14 during a return run of the conveyor belt 10 to, for example, retrieve subsequent food product. Although not shown, a dryer device or blower may be used to direct clean, dry air in the direction of arrow 45 after washdown to dry the support members 14.

Each one of the support members 14 can articulate or be displaced at different intervals from adjacent or other support members 14 by applying force to either the individual support member 14 or the pin 16. The side links 20,21 and the rods 40,42 drive and support the support members 14. An additional drive system is not needed to contact and displace the pins 16 and hence the support members 14.

Force can be applied to an underlying portion of each of the support members 14 to displace same along its line of travel. The force applied to the support members 14 will agitate the products so that they separate or remain separated from each other. Product that adheres to the belt will be dislodged from the belt under the effect of the force applied to the underside of the support members 14.

The construction of the plurality of transport assemblies is such that when the transport assemblies transition around a drum (not shown) or sprocket (not shown) in a manner similar to that shown in FIG. 4, the pin 16 (actuation member) will face the drum or sprocket.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

What is claimed is:

1. A conveyor belt for transporting a product, comprising:
a plurality of transport assemblies, each one of the plurality of transport assemblies comprising:
a side link assembly (20) comprising a pair of side links, each one of the side links in said pair comprising a central elongated aperture;
a support assembly (40, 42) comprising a pair of opposed ends, each one of said pair of opposed ends coacting with a corresponding one of the pair of side links;
a product support member (14) having a surface for transporting the product thereon, the product support member supported on the support assembly and adapted for displaceable movement between a first position and a second position out of plane from the first position; and
an actuation member (16) supporting the product support member with respect to the side link assembly and the support assembly, the actuation member coacting with the central elongated aperture of the side links for moving the product support member between the first position and the second position for providing a space between the product support member and an adjacent product support member of an adjacent one of the plurality of transport assemblies.

2. The conveyor belt of claim 1, wherein the plurality of transport assemblies are arranged adjacent each other such that a plurality of the product support members provide an upper surface upon which the product is conveyed.

3. The conveyor belt of claim 1, wherein each one of the side links further comprises a pair of holes disposed at opposed sides of the central elongated aperture for receiving the corresponding opposed ends of the support assembly.

4. The conveyor belt of claim 1, wherein the support assembly comprises a pair of pins.

5. The conveyor belt of claim 1, wherein the plurality of transport assemblies are arranged with respect to each other to transition around a drum with the actuation member facing the drum.

6. The conveyor belt of claim 1, wherein each one of the plurality of transport assemblies is movable independently of other of the transport assemblies.

7. The conveyor belt of claim 1, wherein the product support member is constructed from material selected from stainless steel, plastic, and combinations thereof.

8. The conveyor belt of claim 1, wherein the product comprises a food product.

* * * * *